United States Patent [19]

Laucus

[11] Patent Number: 4,613,250
[45] Date of Patent: Sep. 23, 1986

[54] REFURBISHED JOINT AND METHOD FOR REFURBISHING IT

[76] Inventor: Johnnie Laucus, 631 Grape St., La Junta, Colo. 81051

[21] Appl. No.: 593,819

[22] Filed: Mar. 27, 1984

[51] Int. Cl.⁴ .......................... F16D 1/00; F16C 11/06
[52] U.S. Cl. ...................................... 403/11; 403/138; 403/137; 403/143; 403/122; 29/149.5 B; 29/441 R; 29/402.06; 384/206; 384/208; 280/95 A
[58] Field of Search ................ 403/11, 138, 137, 144, 403/143, 36, 122; 29/149.5 B, 441, 401.1, 402.06, 402.08; 384/203, 206, 208–212; 280/95 A

[56] References Cited

U.S. PATENT DOCUMENTS

| | | | |
|---|---|---|---|
| 2,364,176 | 12/1944 | Waldrow | 403/144 |
| 2,421,588 | 6/1947 | Venditty | 403/138 X |
| 2,657,945 | 11/1953 | Britt | 403/144 |
| 2,848,260 | 8/1958 | Moskovitz | 403/11 |
| 3,111,334 | 11/1963 | Krizman | 384/206 |
| 3,124,394 | 3/1964 | Rowlett | 280/45 A |
| 3,163,451 | 12/1964 | Krizman | 403/38 |
| 3,305,281 | 2/1967 | Dumpis | 280/95 A |
| 4,491,436 | 1/1985 | Easton | 403/112 |

FOREIGN PATENT DOCUMENTS 350186  6/1931  United Kingdom ............... 403/138

Primary Examiner—Cornelius J. Husar
Assistant Examiner—Todd G. Williams
Attorney, Agent, or Firm—Sheridan, Ross & McIntosh

[57] ABSTRACT

A kit for use in refurbishing a worn joint in a member, such as a tie or drag link, is provided. The kit contains a bushing, a spring, a housing and a plug for use with the old stud to provide a reliable, rotational, flexible and tight joint.

19 Claims, 8 Drawing Figures

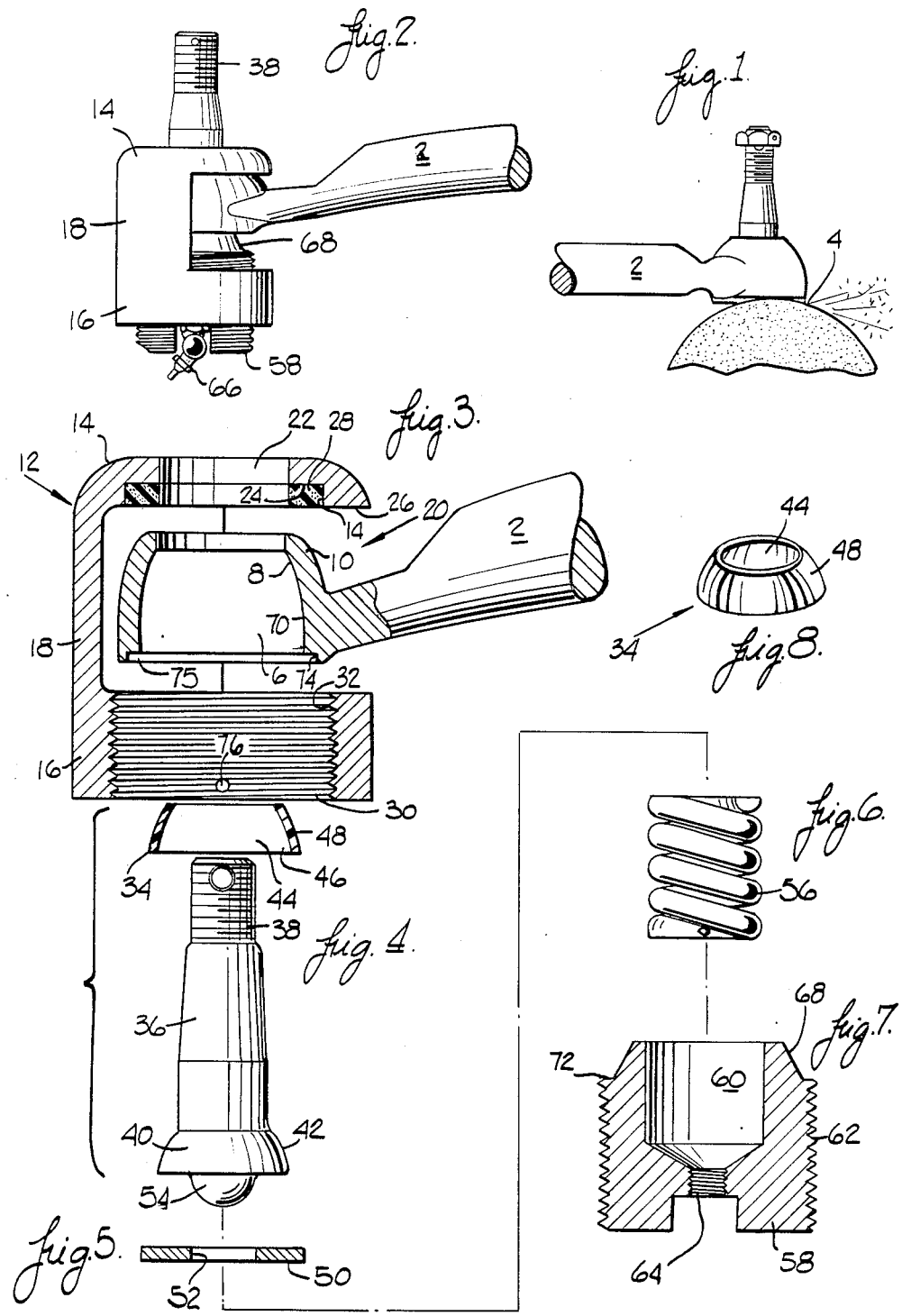

REFURBISHED JOINT AND METHOD FOR REFURBISHING IT

FIELD OF INVENTION

This invention relates generally to the refurbishing of a worn tie rod or drag link joint to provide a flexible and tight joint.

BACKGROUND OF THE INVENTION

Most motor vehicles have a tie rod or drag link having a flexible joint at each end thereof. During the normal life of these motor vehicles, one of these joints will become worn and need to be replaced. This is necessary since a worn joint will cause substantial play in the steering mechanism and could result in an accident and injury. In some prior art practices, even if only one joint was worn, it is necessary to insert a new tie rod or drag link with two new joints.

BRIEF DESCRIPTION OF THE INVENTION

This invention provides a kit for use in refurbishing a worn joint and a method for refurbishing such worn joint. In the preferred embodiment, a tie rod having at least one worn joint is removed from the motor vehicle. A portion of the tie rod adjacent the worn joint is removed leaving an opening extending through the tie rod. Using the stud from the worn joint, the tie rod and the refurbishing kit of this invention, the tie rod is provided with a reliable, flexible and tight joint.

The refurbishing kit of the preferred embodiment comprises a housing having an opening in a sidewall thereof through which the end of the tie rod having the opening extending therethrough is inserted. The inner surface of the opening in the tie rod adjacent one end thereof is shaped as a frustum of a sphere. The tie rod is positioned so that the opening in the end of the tie rod is aligned with two spaced apart openings in the housing. A bushing is mounted on the stud which is then passed through the openings in the housing and the tie rod. The bushing has an external surface shaped as a frustum of a sphere and is moved into mating engagement with the correspondingly shaped inner surface of the tie rod. A plug having a spring seated in an internal cavity therein is threadedly connected to the housing. The plug is screwed into the housing until a portion of the plug contacts a portion of the tie rod surrounding the opening. Under these conditions, the spring exerts a predetermined amount of force on the stud and bushing to ensure proper contact between the bushing and the inner surface of the tie rod to provide for controlled rotational and pivotal movement of the stud relative to the tie rod.

It is an object of this invention to provide a kit and method for refurbishing a joint such as one associated with the steering mechanism of a motor vehicle.

It is another object of this invention to provide a kit and method for refurbishing a joint to provide a refurbished joint that is safe, inexpensive and easy to install.

It is a further object of this invention to provide a kit and method for refurbishing a joint where the kit contains parts which cooperate with the original parts of the joint to provide a flexible and tight refurbished joint.

Other features and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

BRIEF DESCRIPTION OF THE DRAWING

FIG. 1 is a view illustrating the removal of a portion of joint;

FIG. 2 is a view of a refurbished joint in assembled condition;

FIGS. 3-7 are view illustrating the various components prior to assembly; and

FIG. 8 is a perspective view of a bushing of this invention.

DETAILED DESCRIPTION OF THE INVENTION

In FIG. 1, there is illustrated a member 2, such as a tie rod or drag link, which has been removed from a motor vehicle because the joint therein is worn. A portion 4 of the member is removed and the worn joint is removed leaving an opening 6, illustrated in FIG. 3, extending therethrough. The inner surface 8 of the opening 6 adjacent the top 10 of the member 2 has a configuration which is a frustum of a sphere for a purpose to be described below.

The major components of the refurbishing kit are illustrated in FIGS. 3-7. A housing 12, generally shaped like a helmet, has an upper portion 14 connected to a lower portion 16 by an integral side wall 18. The housing 12 is generally cylindrical with the wall 18 having an arcuate extent of about 180° so that an opening 20 exists in the housing 12 between the upper portion 14 and the lower portion 16. The upper portion 14 has an opening 22 extending therethrough. A recess 24 extends inwardly from the surface 26 and surrounds the adjacent portion of the opening 22 and a resilient washer 28, such as a felt dust seal, is seated in the recess 24. The lower portion 16 is provided with an opening 30 extending therethrough and this opening 30 is provided with threads 32. In FIG. 3, the member 2 has been inserted through the opening 20 so that the openings 30, 6 and 22 are in alignment. The housing 12 may be constructed from any suitable material such as cast iron, steel, aluminum, and nylon.

A bushing 34 and a stud 36 are illustrated in FIG. 4. The stud 36 is the one that was removed from the worn joint. The stud 36 has a threaded upper section 38 and a lower portion 40 having a surface 42 which comprises a frustum of a sphere. The bushing 34 has an opening 44 extending therethrough and has an inner surface 46 which also comprises a frustum of a sphere and is dimensioned to fit around the surface 42. The outer surface 48 of the bushing 34 also comprises a frustum of a sphere and is dimensioned to cooperate with the surface 8 of the member 2. Beneath the stud 36, there is a washer 50, formed from a suitable material such as steel, having an outer diameter substantially equal to the largest diameter of the bushing 34 and an inner opening 52 having a diameter slightly smaller than the largest diameter of the ball shaped projection 54 on the stud 34. Since the diameter of the inner opening 52 is slightly smaller than the largest diameter of the projection 54, a space will exist between the upper surface of the washer 50 and the lower surface of the stud 36 which lower surface surrounds the projection 54. The bushing 34 may be constructed from any suitable material, such as nylon, steel and brass.

In FIGS. 6 and 7, there are illustrated the spring 56 and the plug 58. The plug 58 has an internal cavity 60 in which the spring 56 is seated when in assembled relationship. The spring 56 has a length greater than the length of the cavity 60 so that the spring 56 projects out of the cavity and into contact with the washer 50 for a purpose to be described below. The outer surface of the plug 58 is provided with threads 62 dimensioned to cooperate with threads 32 in the lower portion 16 of the housing 12. A threaded opening 64 extends through the plug 58 into the cavity 60 and receives a grease zerk 66. The plug 58 is provided with a tapered surface 68 that fits into the lower portion 70 of the opening 6 and is provided with a flat shoulder 72 which is adapted to be positioned in contact with the flat surface 74 of the recess 75 in the member 2. In some instances because of tolerances or other reasons, the movement of the plug 58 into the opening 6 will be halted by contact between the tapered surface 68 and the lower portion 70 of the opening 6 of the member 2. The relationship of the spring 56 and the plug 58 is designed so that even under these conditions, the spring 56 will exert the proper amount of force for a purpose to be described below.

The assembly is made by first inserting washer 28 in the recess 24 and the housing 12 is moved relative to the member 2 so that the member 2 passes through opening 20. The housing is then positioned so that the washer 28 is in contact with the top 10 of the member 2. The bushing 34 is then placed on the stud 36 so that the surfaces 42 and 46 are adjacent to each other. The stud 36 and bushing 34 are moved through the openings 30, 6 and 22 until the outer surface 48 of the bushing 34 is in contact with the inner surface 8 of the opening 6. The spring 56 is placed into the cavity 60 and the plug 58 is threaded into the opening 30. At the proper time, the washer 50 is positioned above the spring 56. Rotation of the plug 58 is continued until the shoulder 72 is in contact with the surface 74. At this time the spring 56 is exerting a predetermined amount of force on the washer 50 which transmits the force to the stud 36 to urge the outer surface 48 of the bushing 34 into contact with the inner surface 8 of the opening 6. Since the outer surface 48 of the bushing 34 and the inner surface 8 of the opening 6 are each a frustum of a sphere, the stud 36 can rotate and pivot relative to the member 2. Additional rotational and pivotal movement are derived from the relationship between the ball shaped projection 54 and the washer 50. Because of the differences in diameter, there exists a space between the washer 50 and the surface of stud 36 surrounding the projection 54 to allow for the additional rotational and pivotal movement. During pivotal movement of the stud 36, the bushing 34 and the lower portion 40 will move relative to the washer 50 until contact is made between the bushing 34 and the washer 50. Continued pivotal movement is obtained by compressing the adjacent portion of the spring 56. In some instances, both of these functions may occur simultaneously. In due course, the inner diameter 52 may wear so that the washer 50 will be in contact with the adjacent surfaces of the plug 36 and the bottom of the bushing 34. Under these circumstances, the natural action of the spring 56, as described above, will allow for pivotal movement while still urging the various components into contact with each other. In some instances, the diameter of the opening 52 may initially be large enough to provide for such contact from the beginning. Also, the force exerted by the spring 56 is sufficient to cause the top 10 of the member 2 to compress the washer 28 so that the top 10 is within the recess 24 so as to help in preventing relative movement between the member 2 and the housing 12. In some instances, the washer 28 may be omitted but the top 10 of the member 2 will still enter into the recess 24 to cooperate in limiting relative movement between the member 2 and the housing 12.

After the assembly has been made, a cotter pin (not shown) is inserted through the opening 76 in the lower portion 16 and a corresponding opening in the plug 58 to retain the various components in assembled reltionship. Also, a sufficient amount of grease is pumped through the grease zerk 66 to provide lubrication for the refurbished joint.

While the preferred embodiments of the invention have been illustrated and described herein, it may be otherwise embodied and practiced within the scope of the following claims.

What is claimed is:

1. A refurbished joint comprising:
    a hollow housing having an opening in a sidewall thereof for receiving an end of a member;
    said member having an opening extending therethrough;
    means for retaining said member in a desired relationship with said housing;
    a first opening in said housing in alignment with said opening in said member;
    a stud extending through said opening in said member and said first opening;
    means for providing rotational and pivotal movement between said member and said stud;
    means for urging said stud against said member and said member against said housing; and
    means for retaining said means for urging, said stud, said member and said housing in an assembled relationship.

2. A joint as in claim 1 and further comprising:
    a bushing between and in contact with said member and said stud.

3. A joint as in claim 2 and further comprising:
    said member having an internal surface shaped as a frustum of a sphere;
    said bushing having an external surface shaped as a frustum of a sphere; and
    said internal surface of said member and said external surface of said bushing being dimensioned to provide for at least a portion of said rotational and pivotal movement.

4. A joint as in claim 3 wherein said retaining means comprises:
    a second opening in said housing spaced from said first opening;
    said second opening having threads thereon;
    a plug in said second opening; and
    said plug having threads in engagement with said threads of said second opening.

5. A joint as in claim 1 wherein:
    said means for retaining said member in a desired relationship with said housing includes a recess in said housing adjacent said first opening and a portion of said member seated in said recess; and
    said means for urging said stud against said member and said member against said housing comprises resilient means.

6. A joint as in claim 5 and further comprising:
    a bushing between and in contact with said member and said stud.

7. A joint as in claim 6 and further comprising:
said member having an internal surface shaped as a frustum of a sphere;
said bushing having an external surface shaped as a frustum of a sphere; and
said internal surface of said member and said external surface of said bushing being dimensioned to provide for at least a portion of said rotational and pivotal movement.

8. A joint as in claim 7 wherein said retaining means comprises:
a second opening in said housing spaced from said first opening;
said second opening having threads thereon;
a plug in said second opening; and
said plug having threads in engagement with said threads of said second opening.

9. A joint as in claim 8 and further comprising:
an internal cavity formed in said plug;
a spring in said cavity; and
said plug and said housing being threadedly adjusted so that a predetermined force will be exerted by said spring to urge said stud against said bushing and said bushing against said member.

10. A joint as in claim 9 and further comprising:
a washer between said spring and said stud;
said washer having an external diameter substantially the same as the largest external diameter of said bushing;
means for providing a space between said plug and said washer; and
said means allowing for another portion of said rotational and pivotal movement.

11. A method for refurbishing a joint comprising:
providing a member having an opening extending therethrough adjacent to one end thereof;
providing a housing having an opening in a sidewall thereof;
inserting said member into said housing through said opening;
providing said housing with a first opening;
positioning said member relative to said housing so that said opening in said member and said first opening are in alignment;
inserting a stud through said opening in said member and said first opening;
providing said stud with an external surface complimentally shaped with an internal surface of said member;
to provide for rotational and pivotal movement between said stud and said member;
urging said stud against said member; and
retaining said stud, said member and said housing in an assembled relationship.

12. A method as in claim 11 and further comprising:
providing a bushing; and
locating said bushing between said stud and said member.

13. A method as in claim 12 and further comprising:
providing said member with an internal surface shaped as a frustum of a sphere;
providing said bushing with an external surface shaped as a frustum of a sphere; and
dimensioning said internal and external surfaces to provide for at least a portion of said rotational and pivotal movement.

14. A method as in claim 13 and further comprising:
preventing relative movement between said bushing and said stud.

15. A method as in claim 14 and further comprising:
providing a plug having external threads;
providing a second opening in said housing aligned with said first opening;
providing said second opening with threads; and
screwing said plug into said second opening to retain said stud, said member and said housing in an assembled relationship.

16. A method as in claim 15 and further comprising:
providing said plug with an internal cavity;
positioning a spring in said cavity; and
screwing said plug into said second opening until said spring exerts a predetermined force on said plug.

17. A method as in claim 16 and further comprising:
lubricating said external surface of said bushing.

18. A method as in claim 17 and further comprising:
providing a seal between said member and said housing.

19. A method as in claim 18 and further comprising:
inserting a washer between said spring and said plug;
mounting said washer relative to said plug to provide an annular space between said washer and said plug to provide for rotation and pivotal movement between said washer and said stud.

* * * * *